United States Patent
Blum et al.

(10) Patent No.: US 6,440,370 B1
(45) Date of Patent: Aug. 27, 2002

(54) REPEATER PIPETTE WITH A HYDRAULIC OPERATING DEVICE

(75) Inventors: Roger Blum; Gerhard Hofmeier; Rudiger Huhn, all of Hamburg (DE)

(73) Assignee: Eppendorf AG, Hamburg (DE)

( * ) Notice: Subject to any disclaimer, the term of this patent is extended or adjusted under 35 U.S.C. 154(b) by 0 days.

(21) Appl. No.: 09/509,886

(22) PCT Filed: Sep. 14, 1998

(86) PCT No.: PCT/EP98/05827

§ 371 (c)(1),
(2), (4) Date: Apr. 3, 2000

(87) PCT Pub. No.: WO99/17880

PCT Pub. Date: Apr. 15, 1999

(30) Foreign Application Priority Data

Oct. 2, 1997 (DE) ........................................... 197 43 660

(51) Int. Cl.⁷ .............................. B01L 3/02; B01L 3/00; B01L 11/00; G01N 1/10; G01N 1/14

(52) U.S. Cl. ...................... 422/100; 422/102; 422/103; 73/863.32; 73/864.01; 73/864.13; 73/864.14; 73/864.16; 73/864.18; 436/180

(58) Field of Search ................................. 422/100, 102, 422/103; 73/863.32, 864.01, 864.11, 864.13, 864.14, 864.16, 864.18; 436/180

(56) References Cited

U.S. PATENT DOCUMENTS

| | | | | |
|---|---|---|---|---|
| 4,399,711 A | * | 8/1983 | Klein | 73/864.16 |
| 5,084,241 A | * | 1/1992 | Parker | 422/100 |
| 5,108,703 A | * | 4/1992 | Pfost et al. | 422/65 |
| 5,330,721 A | * | 7/1994 | Tervamaki | 422/100 |
| 5,456,885 A | | 10/1995 | Coleman et al. | |
| 5,531,131 A | * | 7/1996 | Sabloewski | 73/864.18 |
| 5,672,320 A | * | 9/1997 | Ritter | 422/100 |
| 5,747,350 A | * | 5/1998 | Sattler | 436/180 |
| 5,916,524 A | * | 6/1999 | Tisone | 422/100 |
| 6,006,800 A | * | 12/1999 | Nakano | 141/130 |
| 6,100,094 A | * | 8/2000 | Tajima | 436/54 |
| 6,158,269 A | * | 12/2000 | Dorenkott et al. | 73/37 |
| 6,203,759 B1 | * | 3/2001 | Pelc et al. | 422/100 |
| 2001/0016358 A1 | * | 8/2001 | Osawa et al. | 436/180 |

FOREIGN PATENT DOCUMENTS

| | | |
|---|---|---|
| DE | 2558672 | 7/1977 |
| DE | 2926691 | 5/1983 |
| DE | 4011584 | 10/1990 |
| DE | 4214430 | 11/1992 |
| FR | 2444216 | 8/1980 |
| FR | 2495317 | 6/1982 |

OTHER PUBLICATIONS

Patent Abstract of Japan, 63–169565, Jan., 1987.
Patent Abstract of Japan, 4–161856, Oct., 1990.
M.A. Kalashinokov, "Mathematical Model of Volumetric Flow Rate Generators," Measurment Technique (Russia), 1987, No. 1.

* cited by examiner

*Primary Examiner*—Jill Warden
*Assistant Examiner*—Brian R Gordon
(74) *Attorney, Agent, or Firm*—Sidley Austin Brown & Wood, LLP

(57) ABSTRACT

A pipetting system including a syringe (2), a working piston (5) connectable with the syringe piston (24) and extending into a working chamber (3), an actuating piston (7) extending into the working chamber, and a storage chamber (4) connected with the working chamber (3) by a valve (12) that provides for flow of the hydraulic liquid, which fills both chambers, from the working chamber (3) into the storage chamber when the working piston (5) is displaced into the working chamber (3), for flow of the hydraulic fluid from the storage chamber (4) into the working chamber (3) when the actuating piston is displaced out of the working chamber, and that separates the storage and working chambers (3, 4) when the actuating piston (7) is advanced into the working chamber.

21 Claims, 2 Drawing Sheets

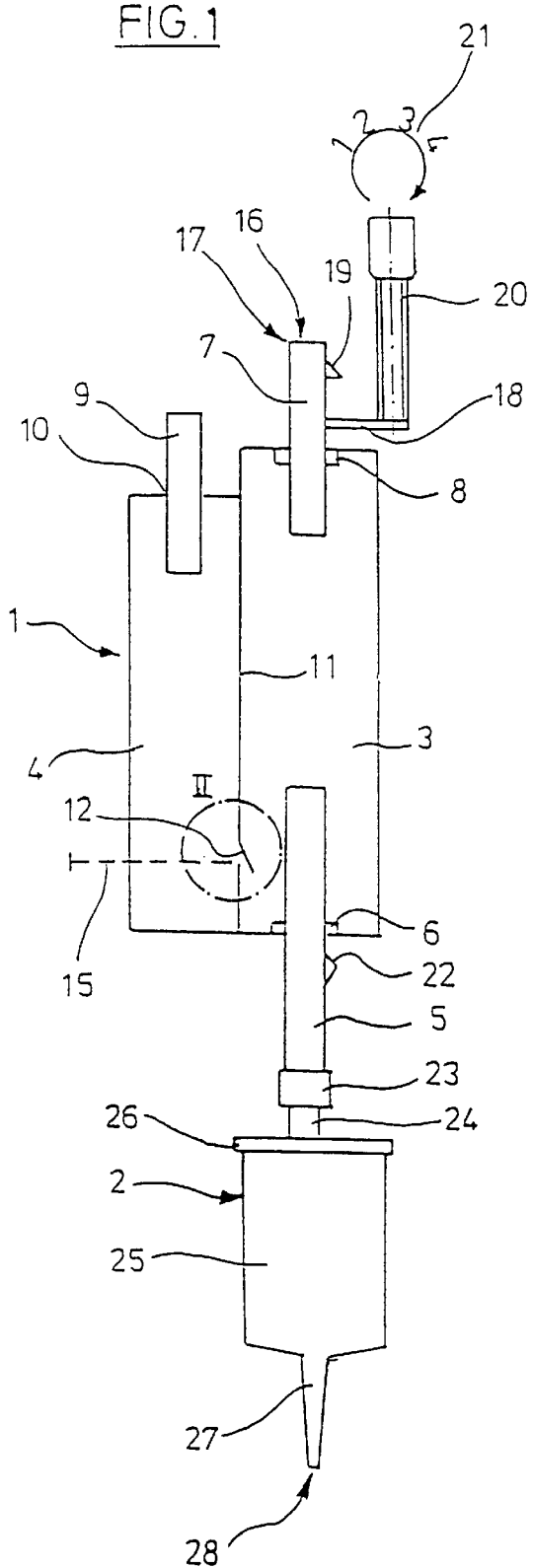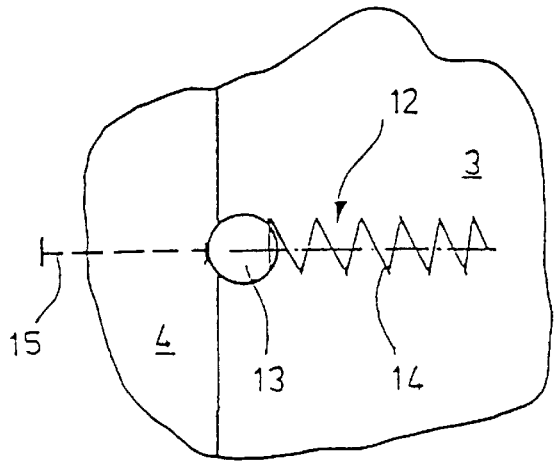

REPEATER PIPETTE WITH A HYDRAULIC OPERATING DEVICE

BACKGROUND OF THE INVENTION

1. Field of the Invention

The invention relates to a pipetting system using a step-and-repeat pipette and a syringe releasably connected thereto.

2. Description of the Prior Art

Pipetting systems of the above-mentioned type serve for proportioning certain liquid volumes (e.g. reagents) and are especially employed at a laboratory. The step-and-repeat pipette is used to hold and actuate the syringe in order to draw liquid into it and dispense the liquid therefrom. The syringe may be replaced with a clean syringe after use and may be disposed of. Suction into the syringe is effected, as a rule, by a single step whereas delivery of certain proportioning volumes may be done by several steps. Pipetting systems using adjustable proportioning volumes have been known before.

Thus, DE 29 26 691 C2 discloses a step-and-repeat pipette which has a rack-actuated pawl means for a step-by-step forward motion of a piston by means of a reciprocating driving lever. The rack further has provided on it an adjustably slidable cover to limit the effective pawl engagement to advance the piston. The cover is adapted to be displaced by a regulating member disposed in the pipette casing, which may be designed with a rotary knob. In this: pipetting system, the proportioning volume can only be adjusted by steps the fineness of which is limited by the pitch of the rack.

Pipetting systems having hydraulic actuators in the widest sense are known from the following publications: DE 40 11 548 A1, DE 42 14 430 A1, DE 25 58 672 A1, U.S. Pat. No. 5,456,885, JP 63-169 565 A, JP 4-161 856 A, Measurement Techniques, Vol. 1987, issue 1, pp. 51–53.

Therefore, it is the object of the invention to create a pipetting system of the aforementioned type which makes it possible to continuously change the proportioning volume.

SUMMARY OF THE INVENTION

The inventive pipetting system has a step-and-repeat pipette and a syringe releaseably connected thereto. The step-and-repeat pipette retains the syringe and has means that provides for disfigurement of the syringe piston back away from the syringe aperture and for pushing the syringe piston forward towards the syringe aperture dependent on the liquid volumes to be ejected from the syringe. The providing means includes a working piston connected to the syringe piston and an actuating piston. The working and actuating pistons are sealingly introduced in a working chamber, with the actuating piston having an actuating end which can be actuated from outside. The working piston may be connected directly or indirectly to the syringe piston and the actuating end may be actuated directly or indirectly from outside. A storage chamber is arranged adjacent to the working chamber and has a variable stock volume. The volume may be variable because of an equalizing piston which is sealingly and slidably; introduced in the storage chamber, and/or because of a flexible wall of the storage chamber. In addition, the connection between the working chamber and storage chamber has a valve means which, while the working piston is pushed into the working chamber, especially while the syringe piston is pushed back, allows a hydraulic fluid to pass from the working chamber to the storage chamber. As a result, the liquid volume which is displaced by the working piston while it is pushed it is pushed in is caught by the variable stock . volume of the storage chamber. This makes it possible to charge the syringe with liquid and/or to adjust the working piston in an initial position for the delivery of liquid. In addition, the valve means separates the working chamber from the storage chamber while the actuating piston is pushed into the former in order that the hydraulic liquid may force the working piston out of the working chamber by one step with a view to pushing the syringe piston forward. Separation of the working chamber from the storage chamber will prevent the liquid volume displaced by the actuating piston from being received by the variable stock volume without forcing out the working piston. However, while the actuating piston is pushed back from the working chamber the valve means allows hydraulic liquid to pass from the storage chamber over to the working chamber for refilling. This will replace a volume of hydraulic fluid, which corresponds to the motion of the working piston out of the working chamber so that the working piston is forced out by another step while the actuating piston is actuated next time.

The liquid volume dispensed from the syringe will be dependent upon the distance by which the actuating piston is pushed into the working chamber. Thus, the proportioning volume is infinitely variable. Preferably, the actuating piston is adapted to be moved between a first stop limiting the push-back motion and a second stop limiting the pushing-in motion, which creates reference points for the proportioning volume. When the actuating piston is moved from one stop to the other the proportioning volume is precisely defined. Also preferably, the spacing between the first and second stops may be adjusted by means of an adjustment means. This also helps adjust the volume to be proportioned, which is achieved by moving the actuating piston from one stop to the other. The adjustment means may have a micrometer means and may be coupled to an indicator means for the proportioning volume. Preferably, the actuating piston is biased by a spring in the push-back direction so that it will independently reset itself, after undergoing actuation, to an initial position. for another proportioning step.

The valve means may have a check valve, which opens in the direction of flow from the storage chamber to the working chamber and closes in a reverse direction. The check valve automatically causes a separation of the storage chamber and working chamber while the actuating piston is pushed into the working chamber and automatically eliminates such separation while the actuating piston is drawn out. Moreover, the check valve may be adapted to be actuated from outside for the passage of hydraulic liquid while the working piston is pushed in. In lieu of an active check valve, there may be an extra valve adapted to be actuated from outside between the working chamber and storage chamber.

A springback of the syringe piston sealing lip following a proportioning step may result in the syringe sucking back a small liquid volume. To avoid faulty proportioning, a first working chamber and a second working chamber may exist, the working piston being associated with the first working chamber and being connected to the storage chamber via a valve of the valve means, which may be opened while the working piston is pushed into the first working chamber. Further, the second working chamber may have associated with it the actuating piston and may be connected to the storage chamber via a valve of the valve means, which separates it from the second working chamber while the actuating piston is pushed in and connects it to the second working chamber while the actuating piston is pushed back.

The further valve may be a check valve. The working chambers are interconnected by a further valve means which closes upon completion of the forward motion of the actuating piston. The further valve means may be a further check valve which opens in the direction of flow from the second working chamber to the first working chamber and closes in a reverse direction. When the actuating piston is then relieved and withdrawn the working piston will not be relieved, however, but will be kept under a tension by the closing procedure of the second valve means in the first working chamber, as will the syringe piston. On the other hand, the second working chamber will fill while the actuating piston is withdrawn with the hydraulic liquid volume required. This volume is forced into the first working chamber during the next actuation by the further valve means so that the syringe will at any time dispense the proper proportioning volume.

In addition, there may be a means for avoiding a residual lift, which prevents another proportioning step when the residual liquid volume existing in the syringe is smaller than the adjusted proportioning volume. To this end, the means for avoiding a residual lift may have a means for sensing the position of the working piston while the actuating piston is pushed back, and a means for comparing the residual lift determined to the volume to be proportioned as well as a means for preventing the working piston from further being pushed out when the residual lift is insufficient. Sensing the position of the working piston only during each backward motion of the actuating piston will achieve that the last proportioning procedure possible may still be effected completely. Blocking the further motion of the working piston will achieve that the succeeding proportioning action can no more be started. Preferably, in addition, the blockage of a further motion of the working piston is coupled by the means for avoiding a residual lift to the setting procedure of the adjustment means so that the respective proportioning volume will then be taken into account. Also preferably, the actuating piston will not be blocked when the operation to avoid a residual lift becomes effective, but its actuation is possible with no displacement of the working piston.

Non-defined proportioning volumes may be dispensed when the actuating piston is relieved in the meantime. Therefore, another aspect of the invention provides that there is a means ensuring that the working piston is pushed out of the working chamber, which prevents the actuating piston from moving back and/or the valve means from opening before the completion of the proportioning step. Here, the means ensuring that the actuating piston reaches the second stop is adapted to effect sensing, which is an indication that the proportioning step is fully completed.

BRIEF DESCRIPTION OF THE DRAWINGS

The pipetting system will be explained in detail below with reference to the accompanying drawings, wherein:

FIG. 1 is a basic type of the pipetting system in a roughly schematic representation;

FIG. 2 is an aspect of detail II of FIG. 1 in an enlarged, roughly schematic representation;

DETAILED DESCRIPTION OF THE PREFERRED EMBODIMENTS

Figure 3:
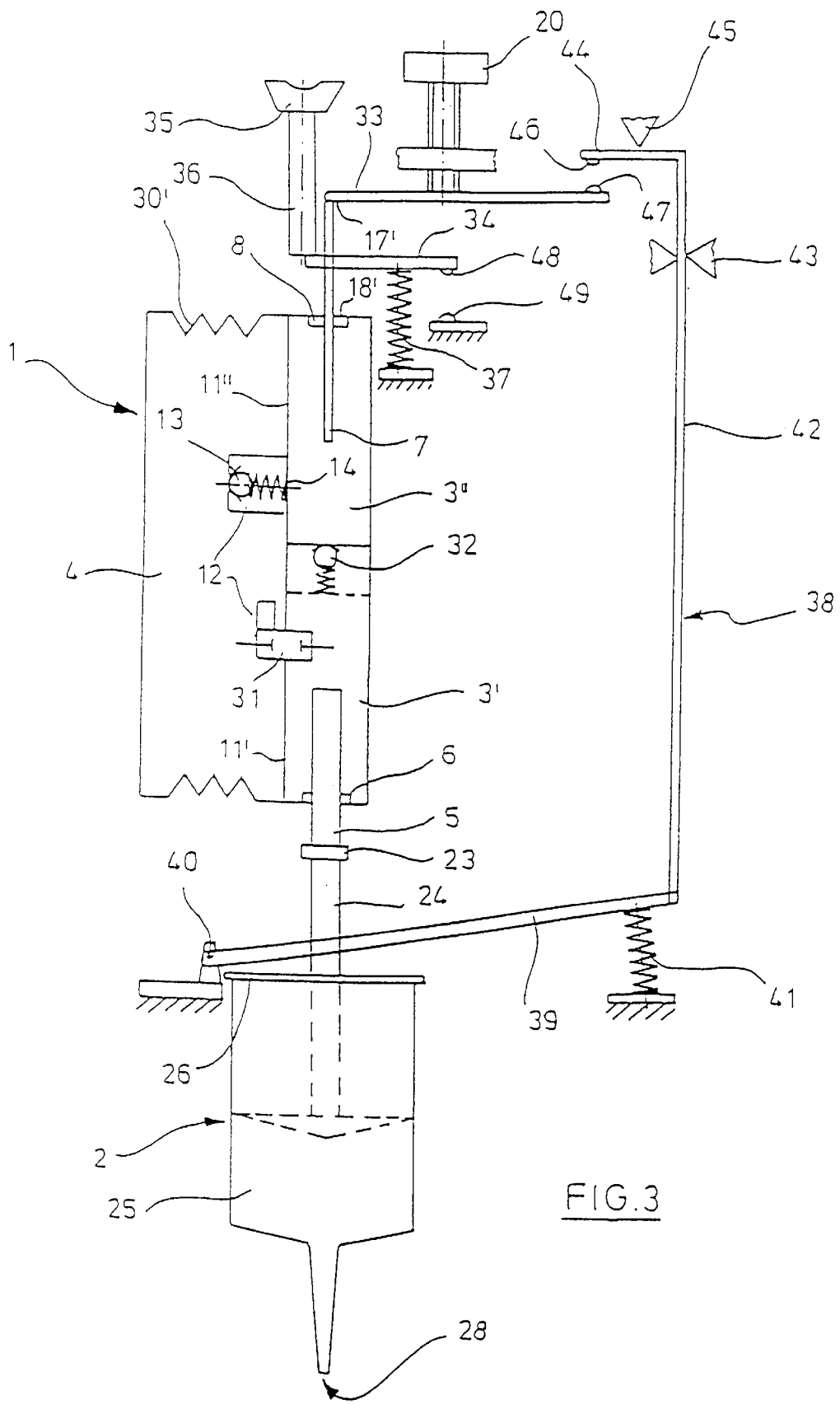
FIG. 3 is a pipetting system using error suppression because of syringe elasticity, residual lift blockage, and full-lift ensurance in a roughly schematic representation.

In the discussion below of various embodiments of the inventive pipetting system, similar elements are designated by the same reference numerals.

The pipetting system of FIG. 1 has a step-and-repeat pipette 1 and a syringe 2.

Step-and-repeat pipette 1 has a working chamber 3 and a storage chamber 4 which are completely filled with a hydraulic medium such as hydraulic oil or water.

A working piston 5 which is sealingly passed through a sealing 6 in a front wall of the working chamber partially extends into working chamber 3. On the opposite side, an actuating piston 7 which also is sealingly passed through a sealing 8 in the wall of the working chamber partially extends into it from outside.

An equalizing piston 9, which is sealingly passed through a sealing 10 in the wall of storage chamber 4 partially extends into the storage chamber from outside.

Working chamber 3 and storage chamber 4 have a valve means 12 in their common partition wall 11. It is designed as a ball-check valve using a ball 13 and a helical spring 14. Check valve 12 opens in the direction of flow from storage chamber 4 to working chamber 3 and closes in the reverse direction. Moreover, it may be opened from outside by means of a pin 15.

The end of actuating piston 7 which projects from working chamber 3 is designed as an actuating button 16. In addition, actuating piston 7 is slidable between a first stop 17, which is firmly joined to step-and-repeat pipette 1, and a second stop 18, against which it strikes by a lug 19. The position of stop 18 in the direction of displacement of actuating piston 7 is adjustable by means of a micrometer screw 20 with which an indicator 21 is associated.

Working piston 5 is provided with a return motion lever 22 on the part projecting from working chamber 3.

Furthermore, the projecting part of working piston 5 is connected to a syringe piston 24 of syringe 2 via a disconnectable coupling 23. Syringe piston 24 of syringe 2 is releasably inserted into a seat (not shown) of pipette 1 by means of a mounting flange 26. At the other end, the syringe cylinder 25 has a dispensing syringe 27 in which a syringe opening 28 is formed.

The pipetting system operates as follows:

Initially, step-and-repeat pipette 1 is connected to syringe 2 with working piston 5 being coupled to syringe piston 24 at 23. Subsequently, syringe piston 24 is pulled out to draw liquid into syringe 2 by pushing working piston 5 into working chamber 3 by an actuation of return motion lever 22. At this point, valve means 12 has been opened by an actuation of pin 15 to cause the liquid displaced by working piston 5 to flow over to storage chamber 4 and force out equalizing piston 9 accordingly. After syringe 2 is filled pin 15 is relieved and valve means 12 closes working chamber 3 with respect to storage chamber 4. When a completely filled syringe 2 is connected working piston 5 may be pushed in before.

In addition, the proportioning volume to be dispensed is adjusted by means of micrometer screw 20 and indicator means 21. The pipetting system makes it possible to set any proportioning volumes within the limits given by the removability of stops 17, 18. For the delivery of the volume set, actuating piston 7 is moved from its initial position at the first stop 17 to the second stop 18. The liquid displaced by actuating piston 7 forces working piston 5 out of working chamber 3 accordingly because valve means 12 is closed. The distance passed through by working piston 5 here corresponds to the spacing between stops 17, 18 multiplied by the ratio of diameters of actuating piston 7 and working piston 5. Accordingly, liquid is forced out of syringe aperture 28 by syringe piston 24.

For another actuating step, actuating piston 7 requires to be withdrawn against the first stop 17, which may be effected automatically by a spring (not shown). During withdrawal, check valve 12 will open automatically and hydraulic liquid will again flow into working chamber 3 from storage chamber 4 in order to substitute for the volume released by actuating piston 7. Irrespective of this embodiment, valve means 12 is allowed to admit liquid slippage only to an extent such that the limits for the precision and correctness of the proportioning system are adhered to. When actuating piston 7 arrives at the first stop 17 the pipetting system will be prepared for another dispensing operation.

The sequence may be repeated several times until syringe piston 24 is completely forced in or until a residual lift blocking device engaging working piston 5 prevents a residual volume falling below the adjusted proportioning volume from being dispensed.

The pipetting system of FIG. 3 has a first working chamber 3' and a second working chamber 3". Working piston 5 is introduced in first working chamber " through sealing 6. Actuating piston 7 is introduced in second working chamber 3" through sealing 8. Next to the first and second working chambers 3',3" there is storage chamber 4 the storage chamber wall of which is formed as a corrugated bellows 30". Disposed in partition wall 11" which is common with second working chamber 3" is ball-check valve 13, 14 which forms part of a valve means 12 and opens in the direction of flow from storage chamber 4 to second working chamber 3" and closes in the reverse directions.

Disposed in the common partition wall 11' of storage chamber 4 and working chamber 3' is a valve 31 adapted to be actuated from outside, which also forms part of valve means 12 and is designed to allow liquid to pass in either direction. Arranged between second working chamber 3" and first working chamber 3' is a further valve means 32 in the form of a ball-check valve, which opens in the direction of flow from the second working chamber to the first working chamber and closes in the inverse direction.

Actuating piston 7 strikes its end projecting from second working chamber 3" against a first stop 17' which is defined by the underside of a plate 33 which is adjustable by means of a micrometer screw 20 in the axial direction of the actuating piston. Another plate 34 which protrudes at its two ends is fixed to the projecting end of actuating piston 7. The path of actuation of actuating piston 7 is defined by the stroke of further plate 34 against the adjoining front-end wall of working chamber 3" which forms a fixed stop 18'.

An actuating button 35 having a pin 36 acts on the short protruding leg of further plate 34. A helical spring 37 supported in step-and-repeat pipette 1 acts on the other leg in the opposite direction. Syringe 2 is retained in step-and-repeat pipette 1 by a syringe flange 26 of its syringe cylinder 25 and is connected, by means of its syringe piston 24, to working piston 5 via a coupling 23 so that it may be disconnected after use.

Step-and-repeat pipette further has a linkage 38. This includes a first articulated bar 39 which is pivotally supported in a fixed bearing 40 in step-and-repeat pipette 1 and extends transversely, while passing by syringe piston 24, in such a way that coupling 23 (or a particular flange) urges against the upper surface of articulated bar 39 towards the end of the displacement motion of syringe piston 24. This one, however, is biased by means of a helical spring 41 towards the working piston 5. The articulated bar 39 senses the position of the working piston (5) when the actuating piston (7) is pushed back.

At the side of syringe piston 24 opposed to bearing 40, articulated bar 39 is linked via a joint to a transfer bar 42 which is guided by a guide 43 in step-and-repeat pipette 1 and has a member 44 angled towards micrometer screw 20. Linkage 38 with its angled member 44 is pressed by spring 41 against a stationary stop 45 in step-and-repeat pipette 1.

Angled member 44 has an electric contact 46 at the side which is directed in a direction opposed to the action of spring 41. An electric contact 47 of plate 33 is associated with this contact. Both the contacts, 46, 47 touch each other when articulated bar 39 is pivoted against the action of spring 41, and transfer bar 42 is pulled downwards accordingly. The downward position of the articulated bar 39 indicates that a residual liquid volume in the syringe (2) is less than the adjusted proportioned volume.

Finally, there is yet another electric contact 48 at the side of plate 34 which is directed in the sense opposed to the action of spring 37. An electric contact 49 which is stationary in step-and-repeat pipette 1 is associated with this contact.

The pipetting system operates as follows:

Initially, step-and-repeat pipette 1 and syringe 2 are connected to each other. Subsequently, working piston 5 is pushed into first working chamber 3' with valve 31 being opened to allow hydraulic liquid to flow from first working chamber 3' over to storage chamber 4 where the increase in volume is compensated by the corrugated bellows 30'.

Micrometer screw 20 is used to infinitely vary the liquid volume to be proportioned. This one displaces first stop 17', which fixes the beginning of the path of motion of actuating piston 7 the end of which is determined by fixed stop 18'. This displacement is linked with a displacement of hydraulic liquid from second working chamber 3", via a further valve means 32, into first working chamber 3', which may be equalized by opening valve 31 if working piston 5 is not to be advanced unintentionally. Of course, the volume may also be adjusted with valve 31 not being opened before working piston 5 is pushed back. When actuating button 35 is depressed actuating piston 7 is pushed into second working chamber 3" according to the volume adjusted and a respective liquid volume passes into first working chamber 3' via further valve means 32 and, in turn, advances working piston 5 there, which ejects the desired liquid volume via syringe piston 24. Upon completion of the actuating lift, further valve means 32 closes and actuating piston 7 and actuating button 35 return to their initial positions under the action of spring 37. At this point, the volume made vacant by actuating piston 7 is substituted for from storage chamber 4 by check valve 13, 14. What is important is that further valve means 32 closes upon completion of the forward motion of actuating piston 7 so that working piston 5 as well as syringe piston 24 will then not be relieved while actuating piston 7 moves back so that elastic recovery effects will not occur in the syringe.

Once actuating piston 7 has reached first stop 17' another liquid volume may be dispensed.

When the coupling 23 ultimately advances the articulated bar 39 downward during a proportioning step, the contacts 46, 47 will touch each other. The downward position of the bar 39 indicates that the residual liquid volume, which is still in syringe 2, no longer corresponds to the proportioned volume adjusted, and the engagement of the contacts 46–47 prevents the following proportioning step from taking place. The proportioned volume adjusted is taken into account here by the setting of contact 47 with the micrometer screw 20.

However, the fact that the residual liquid volume is found to be insufficient to accomplish another proportioning step must not result in a cease of a proportioning step under way. Therefore, a termination of proportioning steps is established by means of contacts 48, 49. More proportioning operations are suppressed following a touch between contacts 46 and 47 only when contacts 48, 49 also have touched each other. This will avoid faulty pipettings when contacts 46, 47 are switched during the last pipetting procedure. Evaluation is electrical and causes valve 31 (which, for example, is electrically controlled) to open. After this, while actuating button 35 may still be actuated, the hydraulic liquid thereby displaced will be discharged into storage chamber 4 without causing working piston 5 to advance, whereby the further proportioning step is interrupted.

The same function can also be achieved by means of a purely mechanical construction.

Finally, this pipetting device has a safety device preventing non-defined volumes from being pipetted by an intermediate relief of actuating piston 34 during the pipetting procedure. For this purpose, actuating piston 7 may have a purely mechanical hold-back which will not be released until second stop 18' is reached. In another solution, check valve 13, 14 may be blocked from outside for a time until second stop 18' is reached. For example, this can be done electrically by fixing the touch between contacts 48, 49 and blocking check valve 13, 14 until the touch. This blockage prevents fresh hydraulic liquid from being drawn from storage chamber 4 to second working chamber 3" in an attempt to pull out actuating piston 7 and from faultily increasing the volume dispensed up to second stop 18' during the succeeding actuation.

What is claimed is:

1. A pipetting system, comprising:
    a step-and repeat pipette (1); a syringe (2) releasably connected with the step-and-repeat pipette (1) and having a syringe aperture (2) and a syringe piston (24) displaceable toward and away from the syringe aperture (28); and
    means providing for displacement of the syringe piston (24) toward and away from the syringe aperture (28), the providing means including:
        a working chamber (3) filled with a hydraulic liquid,
        a variable volume, storage chamber (4) filled with the hydraulic liquid,
        a working piston (5) connectable to the syringe piston (24) and extending into the working chamber (3),
        an actuating piston (7) sealingly extending into the working chamber and adapted to be actuated from outside, and
        valve means (12) interconnecting the working and storage chambers (3 and 4) and providing for (i) flow of the hydraulic fluid from the working chamber (3) into the storage chamber (4) upon displacement of the syringe piston (24) away from the syringe opening (28), for (ii) separating the working chamber (3) from the storage chamber (4) upon displacement of the actuating piston (7) into the working chamber (3), whereby the hydraulic liquid forces the working piston (5) out of the working chamber (3) by one proportioning step for advancing the syringe piston (24) toward the syringe opening (28), and for (iii) flow of the hydraulic fluid from the storage chamber (4) into the working chamber (3) upon displacement of the actuating piston (7) out of the working chamber (3).

2. A pipetting system according to claim 1, wherein the providing means further includes spaced from each other first (17) and second (18) stops between which the actuating piston (7) moves and which limit, respectively, travel of the syringe piston (24) in a direction away from the syringe opening (28) and in direction toward the syringe opening (28).

3. A pipetting system according to claim 2, wherein the providing means further includes means for adjusting spacing between the first and second stops (17 and 18).

4. A pipetting system according to claim 3, wherein the first stop (17) is fixed, and the second stop (18) is adjustable.

5. A pipetting system according to claim 3, wherein the adjusting means comprises micrometer means (20).

6. A pipetting system according to claim 3, wherein the providing means further includes indicator means with which the adjustment means is connected.

7. A pipetting system according to claim 1, wherein the providing means includes a spring (37) for biasing the actuating piston (7) out of the working chamber (3).

8. A pipetting system according to claim 1, wherein the storage chamber (4) has a flexible wall for varying the volume of the hydraulic fluid therein.

9. A pipetting system according to claim 8, wherein the flexible wall is formed as a corrugated bellows (30').

10. A pipetting system according to claim 1, wherein the value means (12) comprises a check valve (13, 14) opening in a direction of flow of the hydraulic liquid from the storage chamber (4) into the working chamber (3).

11. A pipetting system according to claim 10, wherein the check valve is formed as a ball-check valve (13, 14).

12. A pipetting system according to claim 10, wherein the valve means further comprises a valve (31) adapted to be actuated from outside of the pipette (1).

13. A pipetting system according to claim 10, wherein the providing means includes means (15) for actuating the valve means (12) from outside.

14. A pipetting system according to claim 1, wherein the working chamber comprises a first working chamber (3') and a second working chamber (3"), wherein the working piston (5) extends into the first working chamber (3') and the actuating piston (7) extends into the second working chamber (3"), wherein the valve means comprises a valve (31) for connecting the first working chamber (3') with the storage chamber (4) and for enabling flow of the hydraulic fluid from the first working chamber (3') into the storage chamber (4) upon advancing of the working piston (5) into the first working chamber (3'), and a further valve (13, 14) for connecting the second working chamber (3") with the storage chamber (4) and for enabling flow of the hydraulic fluid from the storage chamber (40) into the second working chamber (3") upon displacement of the actuating piston (7) out of the second working chamber (3") and for separating the storage chamber (4) from the second working chamber (3") upon displacement of the actuating piston into the second working chamber, and wherein the providing means further includes further valve means (32) for connecting the first and second working chambers (3' and 3") and for interrupting communication between the first and second working chambers (3', 3") upon completion of displacement of the actuating piston (7) into the second working chamber (3").

15. A pipetting system according to claim 14, wherein the providing means further includes means for actuating the valve (3"), which interconnects the first working chamber (3') with the storage chamber (4), from outside.

16. A pipetting system according to claim 14, wherein the further valve (13, 14), which interconnects the second working chamber (3") with the storage chamber (4), is formed as a check valve.

17. A pipetting system according to claim 14, wherein the further valve means (32) is formed as a further check valve opening in a direction of flow of the hydraulic liquid from the second working chamber (3″) to the first working chamber (3′).

18. A pipetting system according to claim 1, further comprising means for preventing another proportioning step when a residual liquid volume in the syringe (2) is smaller than an adjusted proportioned volume.

19. A pipetting system according to claim 18, wherein the preventing means comprises means (39) for sensing a position of the working piston (5) upon displacement of the actuating piston (7) out of the working chamber (3), means (46, 47) for comparing the residual liquid volume with the adjusted proportioned volume, and a valve (31) for blocking displacement of the working piston (5) when the residual liquid volume is smaller than the adjusted proportioned liquid volume.

20. A pipetting system according to claim 19, further comprising means (20) for adjusting the proportioned volume, coupling means (23) for connecting the working piston (5) with the syringe piston (24), the working piston position sensing means (39) cooperating with the coupling means (23), and the comparing means (46, 47)cooperating with the adjusting means (20).

21. A pipetting system according to claim 14, further composing means (48, 49) for preventing opening of the further valve (13, 14) before the working piston (5) is displaced out of the first working chamber (3′) by an adjusting proportioning distance.

* * * * *